(12) United States Patent
Jain et al.

(10) Patent No.: US 8,589,455 B2
(45) Date of Patent: Nov. 19, 2013

(54) METHODS AND APPARATUS FOR CONTENT-AWARE DATA PARTITIONING

(75) Inventors: Sanjay Jain, Northborough, MA (US); Puneesh Chaudhry, Northbridge, MA (US)

(73) Assignee: COPIUN, Inc., Northbridge, MA (US)

( * ) Notice: Subject to any disclaimer, the term of this patent is extended or adjusted under 35 U.S.C. 154(b) by 125 days.

(21) Appl. No.: 12/642,033

(22) Filed: Dec. 18, 2009

(65) Prior Publication Data

US 2010/0161685 A1     Jun. 24, 2010

Related U.S. Application Data

(60) Provisional application No. 61/138,827, filed on Dec. 18, 2008.

(51) Int. Cl.
    *G06F 17/30* (2006.01)

(52) U.S. Cl.
    USPC .......................................................... 707/812

(58) Field of Classification Search
    USPC .......................................................... 707/812
    See application file for complete search history.

(56) References Cited

U.S. PATENT DOCUMENTS

| | | | |
|---|---|---|---|
| 5,590,810 A | 1/1997 | Wehbi | |
| 5,649,196 A * | 7/1997 | Woodhill et al. | 711/148 |
| 5,873,104 A | 2/1999 | Tremblay et al. | |
| 5,990,810 A | 11/1999 | Williams | |
| 6,065,046 A | 5/2000 | Feinberg et al. | |
| 6,278,992 B1 * | 8/2001 | Curtis et al. | 707/711 |
| 6,377,953 B1 * | 4/2002 | Gawlick et al. | 707/701 |
| 6,487,556 B1 * | 11/2002 | Downs et al. | 707/792 |
| 6,526,493 B1 | 2/2003 | Ding | |
| 6,662,193 B1 * | 12/2003 | Christensen | 707/621 |
| 6,704,730 B2 | 3/2004 | Moulton et al. | |
| 6,742,081 B2 | 5/2004 | Talagala et al. | |
| 6,871,200 B2 * | 3/2005 | MacQueen et al. | 707/770 |
| 6,941,436 B2 | 9/2005 | Lee et al. | |
| 6,959,291 B1 | 10/2005 | Armstrong et al. | |
| 6,976,146 B1 | 12/2005 | Aiello et al. | |
| 7,051,180 B2 | 5/2006 | Downer et al. | |
| 7,065,619 B1 | 6/2006 | Zhu et al. | |
| 7,219,102 B2 * | 5/2007 | Zhou et al. | 707/792 |
| 7,272,602 B2 | 9/2007 | Moulton | |
| 7,305,532 B2 | 12/2007 | Zhu et al. | |

(Continued)

FOREIGN PATENT DOCUMENTS

| | | |
|---|---|---|
| KR | 10-2004-0091392 A | 10/2004 |
| WO | WO-2010/080591 | 7/2010 |
| WO | WO-2011/113042 | 9/2011 |
| WO | WO-2011/116087 | 9/2011 |

OTHER PUBLICATIONS

International Search Report and Written Opinion of the International Searching Authority the Korean Intellectual Property Office for PCT/US2009/068687, mailing date of Aug. 3, 2010, 7 pages.

(Continued)

*Primary Examiner* — Kim Nguyen
(74) *Attorney, Agent, or Firm* — EIP US LLP

(57) ABSTRACT

The systems and methods partition digital data units in a content aware fashion without relying on any ancestry information, which enables one to find duplicate chunks in unrelated units of digital data even across millions of documents spread across thousands of computer systems.

28 Claims, 10 Drawing Sheets

(56) References Cited

U.S. PATENT DOCUMENTS

| | | | |
|---|---|---|---|
| 7,373,464 B2 | 5/2008 | Zhu et al. | |
| 7,472,242 B1 | 12/2008 | Deshmukh et al. | |
| 7,477,166 B2 | 1/2009 | McCanne et al. | |
| 7,504,969 B2 | 3/2009 | Patterson et al. | |
| 7,562,186 B2 | 7/2009 | Li et al. | |
| 7,590,644 B2 * | 9/2009 | Matsakis et al. | 1/1 |
| 7,624,335 B1 | 11/2009 | Maheshwari et al. | |
| 7,979,569 B2 * | 7/2011 | Eisner et al. | 709/231 |
| 2002/0169972 A1 | 11/2002 | Tanaka et al. | |
| 2003/0131154 A1 | 7/2003 | Downer et al. | |
| 2003/0212873 A1 | 11/2003 | Lee et al. | |
| 2004/0073835 A1 | 4/2004 | Kim | |
| 2005/0050459 A1 | 3/2005 | Qu et al. | |
| 2005/0216669 A1 | 9/2005 | Zhu et al. | |
| 2006/0047855 A1 | 3/2006 | Gurevich et al. | |
| 2006/0059171 A1 | 3/2006 | Borthakur et al. | |
| 2006/0069719 A1 | 3/2006 | McCanne et al. | |
| 2006/0069733 A1 * | 3/2006 | Antonoff et al. | 709/206 |
| 2006/0109909 A1 | 5/2006 | Chang et al. | |
| 2006/0206669 A1 | 9/2006 | Zhu et al. | |
| 2006/0212439 A1 | 9/2006 | Field | |
| 2007/0028110 A1 | 2/2007 | Brennan | |
| 2007/0061544 A1 | 3/2007 | Uppala | |
| 2007/0143359 A1 | 6/2007 | Uppala | |
| 2007/0239945 A1 | 10/2007 | Li et al. | |
| 2007/0239946 A1 | 10/2007 | Zhu | |
| 2008/0013830 A1 | 1/2008 | Patterson et al. | |
| 2008/0050025 A1 | 2/2008 | Bashyam et al. | |
| 2008/0050026 A1 | 2/2008 | Bashyam et al. | |
| 2008/0050027 A1 | 2/2008 | Bashyam et al. | |
| 2008/0050029 A1 | 2/2008 | Bashyam et al. | |
| 2008/0050047 A1 | 2/2008 | Bashyam et al. | |
| 2008/0082525 A1 | 4/2008 | Cha et al. | |
| 2008/0133835 A1 | 6/2008 | Zhu et al. | |
| 2008/0159331 A1 | 7/2008 | Mace et al. | |
| 2008/0183767 A1 | 7/2008 | Zhu et al. | |
| 2008/0256143 A1 | 10/2008 | Reddy et al. | |
| 2008/0270729 A1 | 10/2008 | Reddy et al. | |
| 2008/0281908 A1 | 11/2008 | McCanne et al. | |
| 2008/0294660 A1 | 11/2008 | Patterson et al. | |
| 2008/0320106 A1 | 12/2008 | McCanne et al. | |
| 2008/0320151 A1 | 12/2008 | McCanne et al. | |
| 2009/0063528 A1 | 3/2009 | Yueh | |
| 2009/0063795 A1 | 3/2009 | Yueh | |
| 2009/0079597 A1 | 3/2009 | McCanne et al. | |
| 2009/0216774 A1 | 8/2009 | Rao et al. | |
| 2009/0216788 A1 | 8/2009 | Rao et al. | |
| 2009/0240718 A1 | 9/2009 | Rao et al. | |
| 2009/0265397 A1 | 10/2009 | Williams | |
| 2009/0287725 A1 | 11/2009 | Von Praun | |
| 2009/0289819 A1 | 11/2009 | Mahoney | |
| 2010/0161608 A1 | 6/2010 | Jain et al. | |
| 2011/0231374 A1 | 9/2011 | Jain et al. | |

OTHER PUBLICATIONS

International Search Report and Written Opinion of the International Searching Authority, the Korean Intellectual Property Office, for International Application No. PCT/US2011/028318, date of mailing Sep. 27, 2011, 7 pages.

* cited by examiner

METHODS AND APPARATUS FOR CONTENT-AWARE DATA PARTITIONING

CROSS-REFERENCE TO RELATED APPLICATIONS

This application claims priority to U.S. Provisional Application 61/138,827, filed Dec. 18, 2008, the entire contents of which are incorporated herein by reference.

BACKGROUND OF THE INVENTION

Modern computer systems hold vast quantities of data that is increasing rapidly; so rapidly, in fact, that in many cases the increase threatens to outstrip the capacity of storage systems. For some companies, data growth can be as high as 30-40% per year. This growth not only needs a continuing investment in newer and bigger storage systems, it also requires a corresponding increase in the cost of managing those systems. It is highly desirable to decrease the amount of storage within a company, as the storage can significantly reduce the capital and operational expenditure of a company.

One characteristic of the data stored in most mass storage systems is that there is a tremendous amount of duplication of data. Examples include duplicate files, files that are slightly different (e.g. multiple drafts of the document), same images being stored in multiple documents, same templates or stationery being applied to presentations etc. While there are some systems that can detect identical files and store them only once, typical systems still require storing large amount of duplicate data. For example, practically every document in a company has the company logo embedded within it, but today's storage techniques are unable to recognize that the same data for the logo is being repeated in every document and are unable to save on storage for that.

There is increased emphasis on sub-file data de-duplication to detect duplicate data at a sub-file level to reduce the storage and network footprint for primary storage as well as secondary storage uses like backup and archive. In recent times, various systems have been designed that can detect duplicate data at sub-file level. Essentially all de-duplication systems create one or more 'chunks' out of the file or block storage unit being analyzed for de-duplication and then employ one or more methods of comparison to detect whether a duplicate chunk has been produced.

Current methods of partitioning, or chunking, data are often ineffective at finding common sub-objects in absence of ancestry information about the digital data units being evaluated for de-duplication. For example, if one is aware that file B is derived from file A, one can do a delta comparison between the two files to find common sub-objects or use a "sticky bits" method to partition data. However, in absence of any ancestry knowledge finding common sub-objects requires extreme computational complexity, especially when applied to today's highly distributed computer systems with millions of files spread across thousands of computer systems where ancestry information is scarce.

SUMMARY OF THE INVENTION

This disclosure provides methods and systems to achieve content aware and object based chunking of digital data (e.g., file, block, BLOB (i.e., binary large object), or stream data) to increase the probability of identifying duplicated chunks. The systems and methods can be used for various information storage scenarios, including scenarios where:

1) digital data is comprised of one or more logical objects;
2) logical objects within digital data contain positional data which changes when the object's relative position is changed (e.g., position-dependent data) resulting in a different byte pattern for the object;
3) logical objects within digital data contain metadata which changes every time a file is saved (e.g., instance-dependent data); examples of such metadata are: author name, modified date, revision number, etc.;
4) logical objects in digital data are stored after applying transformations to the original data, e.g., compression/encryption;
5) logical objects in digital data are stored along with a preceding header and/or an appended footer that is specific to the specific file, block or stream based storage instance or type;
6) same logical objects in digital data are shared across different file or block storage units or streams, where the files/blocks/streams are of the same or different type;
7) a logical object is broken into multiple pieces while storing it in the file/block/BLOB storage or transmitting on a stream; and/or
8) a logical object in a compound file/block/BLOB/stream is a file object; for example, .PST and .ZIP files have multiple file objects embedded into them.

When partitioning digital data into chunks for the purpose of identifying duplicate chunks, the presence of positional data and metadata results in the storage of different byte patterns for the same underlying logical object depending on the type or instance of the storage unit the object is stored in. The byte patterns may also differ depending on the logical objects' position in the storage unit, and on various transformations specific to a format of the digital data being partitioned. As a result, traditional methods of chunking based on analyzing the byte pattern of the various file based or block based storage units or streams can only find low commonality between different storage units/streams even though they contain the same underlying logical objects. The term 'chunk' and 'logical object' are related—a chunk is generally a sequence of data that multiple files may have in common. Chunks can be based on logical objects or portions of logical objects found in a digital data unit.

The methods described here eliminate the effect of positional data, instance-dependent data, format-specific data, and transformations (e.g., compression/encryption) while chunking the digital data for the purpose of identifying duplicate chunks. This methods result in creating chunks that are common across the same file and even different files of the same or different types, increasing the probability of identifying duplicate chunks than traditional methods. This method can be used to reduce the footprint of primary storage or secondary storage uses like backup or archive along with reducing the amount of data to be transmitted over the network.

The systems and methods described here provide a fully automated, deterministic process for partitioning a digital data sequence (e.g., a file) such that common objects or chunks can be identified on multiple related and unrelated computer systems without the need for direct communication between those computers to search, compare, communicate or coordinate with other processing elements in the operation of finding those common objects.

An advantage of these systems and methods is that the chunking process they employ does not require communication or comparison to perform well (in contrast to conventional delta factoring systems). This approach is particularly effective in a distributed environment where, in contrast to conventional delta factoring systems require comparisons and communication to compare one sequence to another, the system and method of the present invention can be performed in isolation using only the sequence being processed.

In one embodiment, one or more of the following steps are applied, to create chunks from a given piece of digital data (whether file, block, BLOB, or stream based) that needs to be de-duplicated:

1. Break or "Chunk" the given digital data into "whole" logical objects by applying the knowledge about various formats of storing or transmitting digital data. For example, an image in a document would be a "whole" logical object stored in a format specific to the said document. File formats include examples such as .ppt, .doc, .xls, .pptx, .docx, .xlsx, .pdf, .xml, .cpp, .one, .mdb, and .a formats.
2. Handle "Broken" Objects: assemble the logical object if it is physically not on contiguous storage/stream blocks. Sometimes while storing a logical object it can be broken into many small sub-objects that can be scattered across multiple storage blocks. In this case, the logical object is formed after identifying all such sub-objects and assembling them in the correct order.
3. Remove any format specific transformations applied to the logical object. For example, if the logical object is stored in a compressed format within a storage unit then that logical object is un-compressed first before using it as a chunk for de-duplication. Similarly if the logical object is stored as encrypted then that logical object is decrypted before using it as a chunk for de-duplication.
4. Remove any format specific headers/footers attached to the logical objects. Most digital data formats either precede the logical object with a header or append a footer as part of or after inserting the logical object into the said digital data.
5. Remove any position specific data and metadata from the logical block. Many digital data formats store positional data within or around the logical data, e.g. slide numbers in a PowerPoint document.
6. If the object happens to be the file object, then assemble the file object first and then extract the logical objects using above steps. This allows one to find same objects e.g. image within a file object embedded in the compound files formats like .PST/.ZIP.

After the above one or more steps, what is left is a logical object in a native form that is independent of format specific transformations, embedded positional data, surrounding metadata, or effects of the object having been broken into multiple sub-objects for storage purposes. Operating on the logical object in its native form obtained using the methods described above enables one to find duplicate chunks of the data across even unrelated files. It is possible that only one or more steps are applied when identifying the chunk. Some objects may use different steps, and the particular steps used may are dependent on the file type and object type.

Systems and methods are also disclosed for creating a map, such as a block map, that includes a list of objects/chunks that may be used to reconstitute the original digital data. In addition, the systems and methods can also save data that has been removed from or around a chunk for later use. This data includes information about each of the objects that made up the original file, including the various methods that were applied to the original object in the file during the chunking process, as well as the non-chunk data such as page numbers. The data can be used re-apply/restore the various transformations and data that was removed from or around the constituent chunks during the partitioning process, and to reconstruct the original file using the combination of the chunks and the non-chunk data (e.g., position-dependent, instance-dependent, and/or header/footer data that was removed from the chunks and stored separately from them).

Once objects have been identified using the above process, a suitable method for determining whether this logical object already exists can be applied on the object thus created. Two examples of such methods are hash computation on the newly identified logical object, and comparing it with an existing index of hashes or an actual byte by byte comparison with existing objects.

Other features and advantages will become apparent from the following detailed description, drawings, and claims.

DETAILED DESCRIPTION OF THE INVENTION

Content-Aware Partitioning of Digital Data

Different digital data formats (e.g., file based, block based, BLOB based, or stream based) have different formats that attach different attributes and apply transformations to the logical objects stored within them. Most of the time, these attributes and transformations change the byte pattern in and around the logical objects stored within the said digital data.

This results in a situation where the same logical object can be stored with a different byte pattern in two different places within the same or different unit of digital data. This situation causes issues for the traditional, digital data-format-agnostic methods of de-duplication that chunk the data into various blocks using only the physical layout of the data. These methods cannot determine .that the underlying object is common even though the byte pattern is different only due to a transformation or accompanying positional data or header/footer around the logical object.

Logical objects within a unit of digital data typically have one or more of the following attributes or transformations applied to them, each of which hinder finding commonality.

Figure 1:
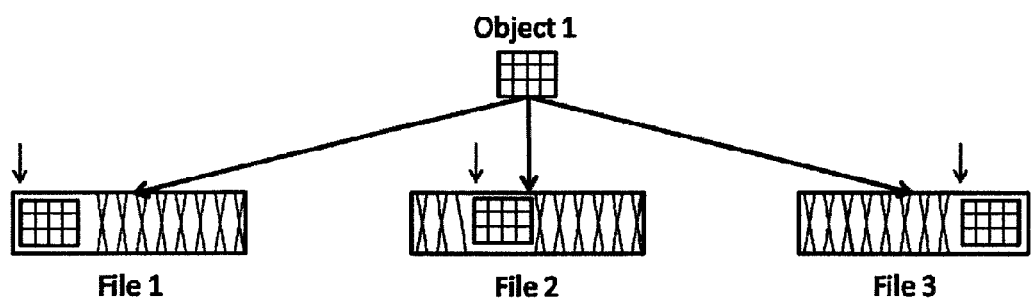
FIG. 1 shows instances of an object stored at different offsets.

FIG. 1 shows the same logical object stored at three different starting offsets within different units of data. For example, the same image could be stored in three different PowerPoint files, but on three different slides and, as a result, at three different starting offsets.

Figure 2:
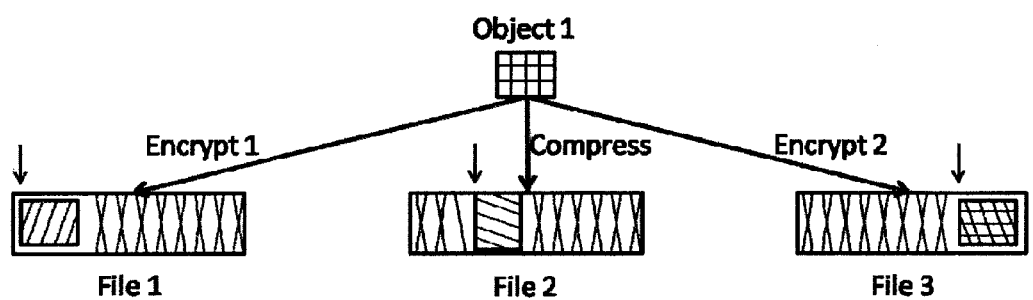
FIG. 2 shows instances of an object stored after various respective transformations.

FIG. 2 shows the same logical object stored in three different digital data formats, where a different transformation has been applied to each of the instances of the object before storing it. For example, Object 1 has been encrypted in a first manner prior to being stored within File 1, compressed prior to being stored within File 2, and encrypted in a second manner prior to being stored within File 3. In this example, the byte pattern of the object post-transformation can be different even for the same underlying original data due to changes in inputs to the transformation: e.g., changes to the compression/encryption algorithm, seed values, etc.

Figure 3:
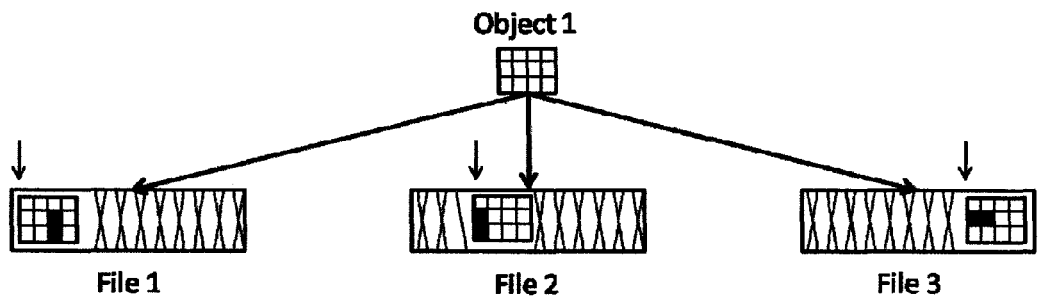
FIG. 3 shows instances of an object stored with different positional data embedded within the instances.

FIG. 3 shows the same logical object containing different position-specific data as the object stored within three different files. For example, in a PowerPoint file, the logical object for a slide contains a slide number within the object. This would result in a different byte pattern for the stored slide if it is moved to a different location, whether within the same or a different PowerPoint file, even though no other changes to the logical slide object have been made.

Figure 4:
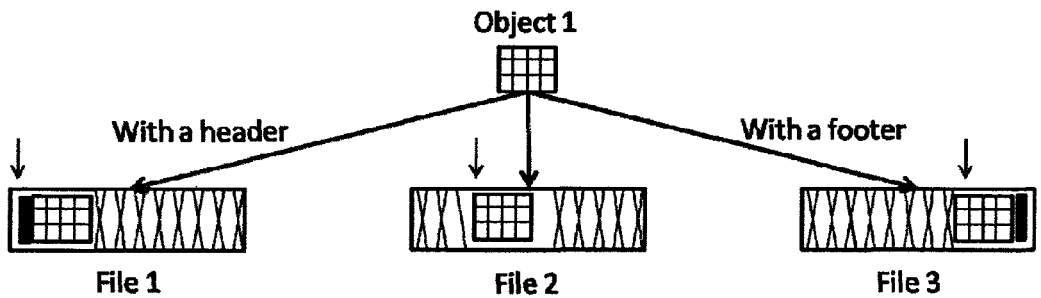
FIG. 4 shows instances of an object stored with and without a header or footer.

FIG. 4 shows instances of the same logical object preceded by a header in File 1, and followed by a footer in File 3. This header or footer can be different for different digital data units, and often contains instance-, type-, or position-specific information. Even though two underlying logical objects may be the same, when viewed in combination with the accompanying header or footer the byte pattern will appear to be different.

Figure 5:
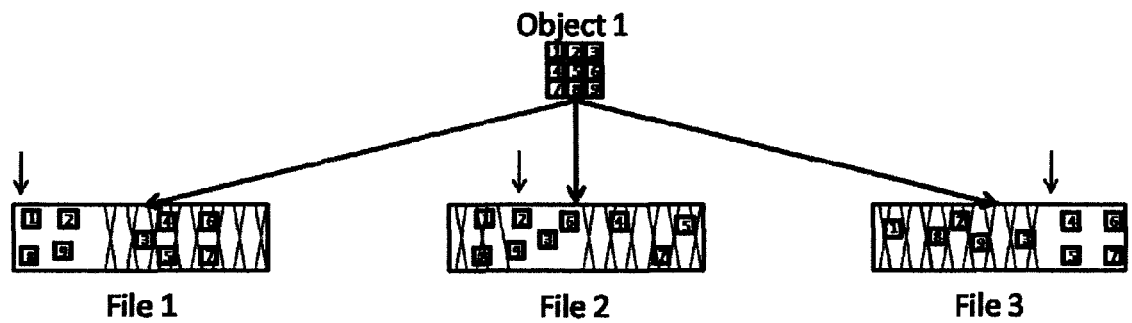
FIG. 5 shows instances of an object stored as multiple sub-objects scattered in different arrangements of sub-objects in each of three files.

FIG. 5 shows the same logical object broken into nine smaller sub-objects (labeled 1-9) scattered across multiple storage blocks/streams for the purpose of storing the object.

The following methods are employed to increase the probability of identifying duplicate chunks existing within logical objects that are stored in the above ways. Each of the methods may be used alone or in combination with the other methods.

Figure 6:
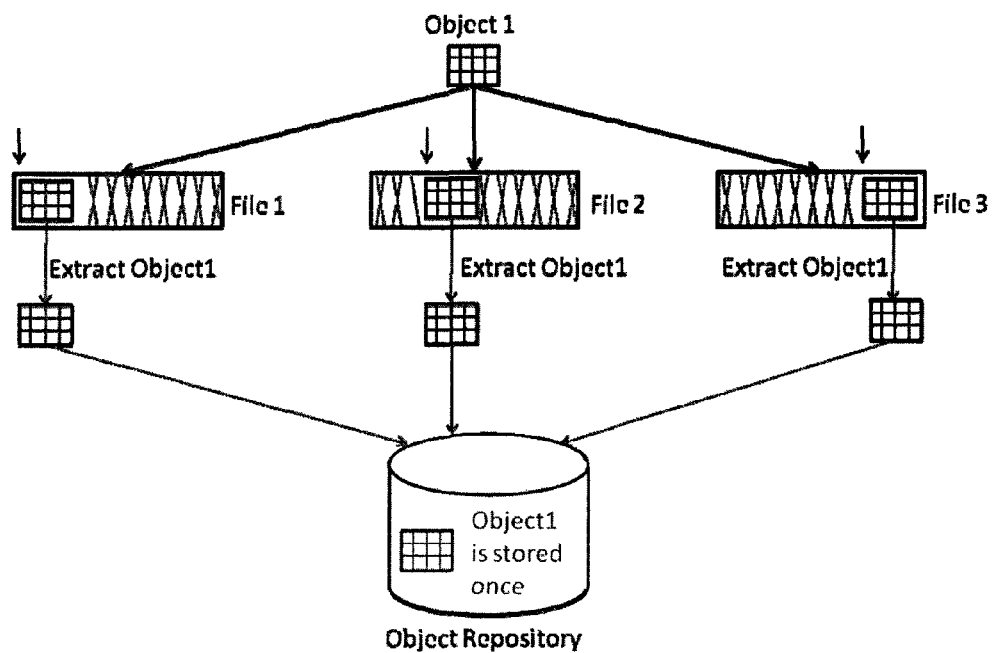
FIG. 6 shows an object, instances of which were originally stored at different offsets, stored once in an object repository.

1. Partition the Digital Data into Logical Objects by Applying Knowledge of Various Digital Data Format Specifications Traditional methods break the digital data being analyzed for de-duplication into chunks in a digital data-format-agnostic way. This approach often leads to sub-optimal chunking because logical objects within the digital data are cut at random intervals, leading to them being distributed across several chunks. A better method is to understand the digital data format and to create chunks at logical object boundaries, and in the process, creating chunks that contain "whole" logical objects instead of random combinations of one or more logical objects. FIG. 6 shows an object, instances of which were originally stored at different offsets, stored once in an object repository.

Figure 7:
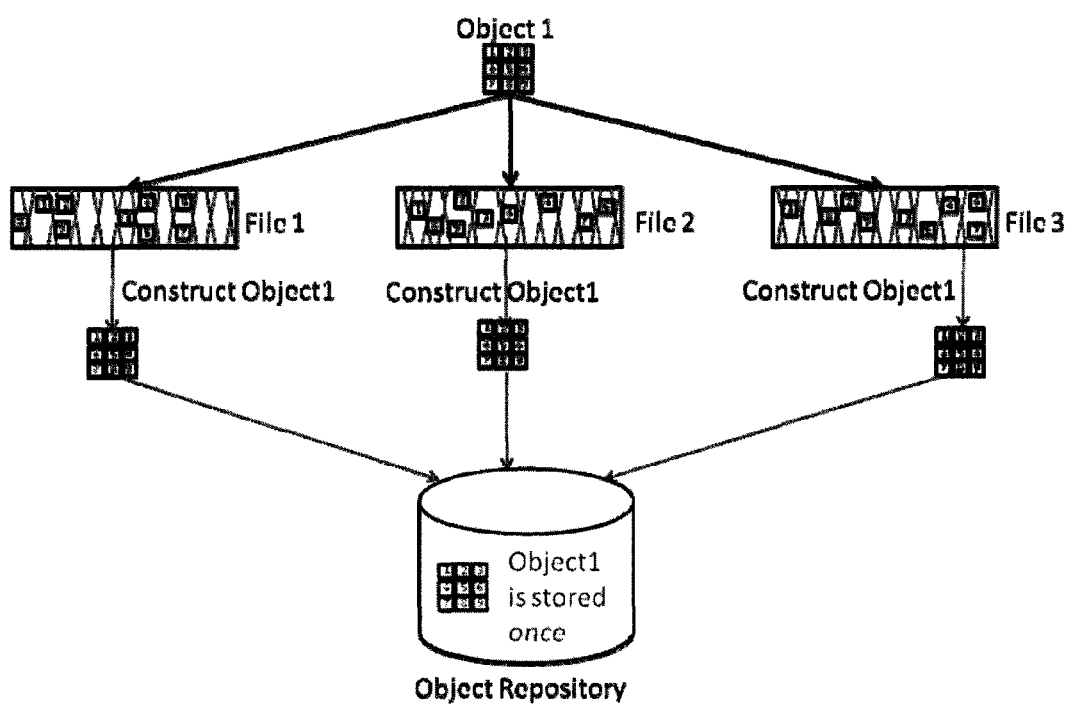
FIG. 7 shows an object, instances of which were originally stored as multiple sub-objects scattered in different arrangements in each of three files, stored contiguously once in an object repository.

2. Handle Broken Objects by Assembling the Broken Object into the One Logical Object Many times a logical object may not be in a contiguous location within a file. As a result the object needs to be first assembled into one single logical object while keeping the list of all file offsets, size for this broken object. This way if the same logical object is broken differently into two of more files, we can still find commonality among them. FIG. 7 shows an object, instances of which were originally stored as multiple sub-objects scattered in different arrangements in Files 1-3, stored contiguously once in an object repository.

3. Un-apply any Transformations to the Logical Objects

Some examples of common transformations applied to logical objects within digital data are compression and encryption. After these transformations are applied, even though the underlying object is the same, the resulting byte pattern can be different.

Figure 8:
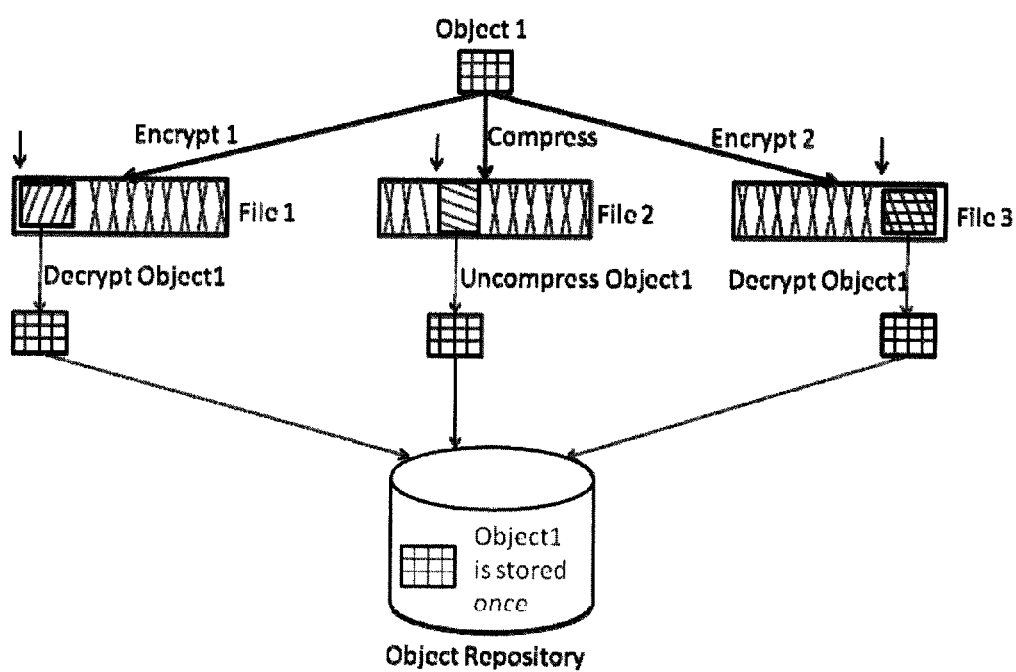
FIG. 8 shows an object, instances of which were originally stored after various respective transformations, stored once in an object repository.

The proposed method "un-applies" any transformations applied to the logical object before creating the chunk for the purpose of identifying duplicate chunks. This allows breaking up of the digital data into logical objects that are common across different file or block storage units, BLOBs, and/or data streams of the same and different types. FIG. 8 shows Object 1 stored as a single instance in an object repository after having been encrypted in a first manner as stored within File 1, compressed as stored within File 2, and encrypted in a second manner prior as stored within File 3. Some examples of where this would allow finding commonality are:

1. The same image object is stored in two different files of the same type that use different compression algorithms.
2. The same image object is stored in two different files of two different types that use different encryption algorithms before storing the same image object.
3. The same image object is stored in three different files of three different types, where the first file format compresses the image before storing it, the second file encrypts the image before storing, while the third stores the image object in its original format.

In all of the above examples, and as shown in FIG. 8, the proposed new method will chunk the file into a logical image object that will be common across the different files.

4. Remove Positional Dependent Data or Metadata from the Logical Objects

Figure 9:
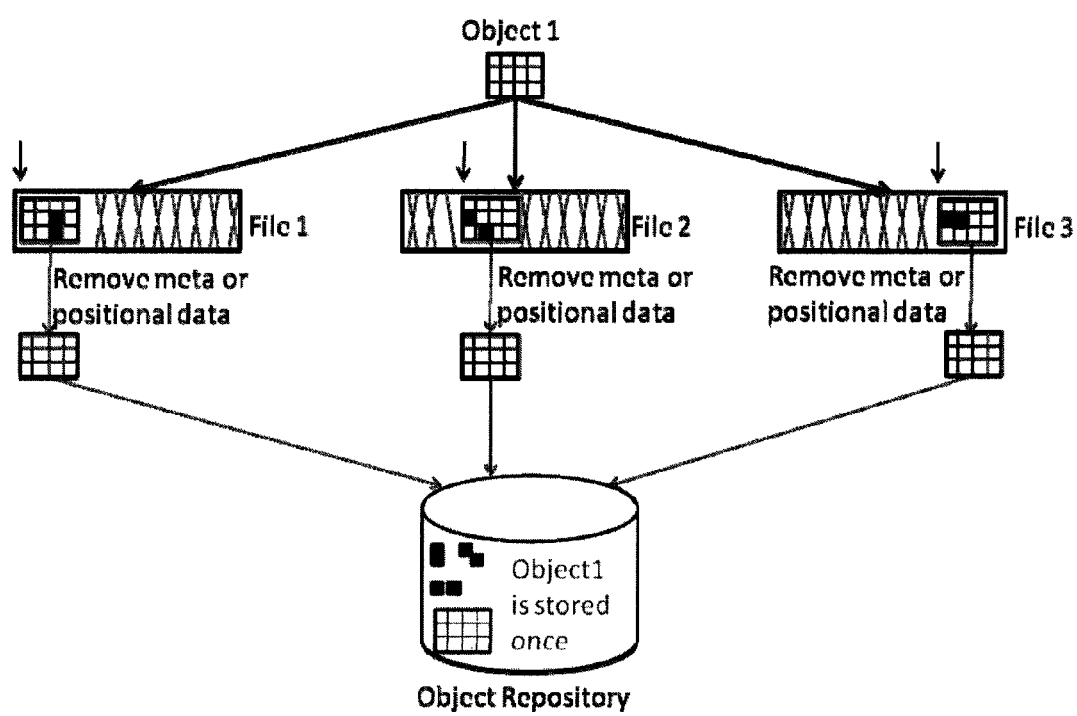
FIG. 9 shows an object, instances of which were originally stored containing respectively different metadata or positional data embedded within, stored once in object repository with the differing data removed from the object and instead stored in the object repository separately from the object.

Another issue that hinders with finding commonality is that the logical objects contain positional data that changes the byte pattern of the logical object every time the relative position of the object is changed, whether within the same digital data unit or a different one. For example, if a slide is moved within a PowerPoint document then the byte pattern of the logical slide object is changed as slide number is part of the slide object. This again hinders the process of finding commonality even though the underlying slide object is the same. Other examples of position dependent data include page numbers, paragraph numbers, and Microsoft Excel cell numbers. Another example is that some objects may contain instance dependent metadata like author name, revision number, modified date, total editing time, number of pages, number of characters, number of lines, number of paragraphs, number of words, etc. These metadata may change every time the file is saved. Removing these metadata from the objects can achieve higher level of de-duplication The systems and methods described here can analyze the logical object for any position dependent or metadata and remove that data from the chunk being created for the purpose of identifying duplicate blocks. FIG. 9 shows an object, instances of which were originally stored containing respectively different metadata or positional data embedded within, stored once in object repository with the differing data removed from the object and instead stored in an object repository separately from the object. The three instances are stored in an object repository as a single instance of the chunk that the three instances had in common, along with the instance specific meta or positional data for each respective instance, along with associations linking the chunk and the instance specific meta or positional data to the respective files in which they were originally stored. The logical object/chunk can also be transmitted instead of, or in addition to, being stored. For example, digital data could be received as a stream, on which content-aware partitioning is performed, after which the extracted chunks and additional data could be transmitted as a de-duplicated data stream containing the chunks, additional data, and the associations linking them. This storage/transmission and association process is discussed in additional detail, below.

5. Exclude Object Header/Footer Before Creating Chunk

Another issue is that the digital data format could precede the logical object with a header or append a footer to it. Such a header or footer is generally different for different digital data instances or types and can contain position dependent information. Even though two underlying logical objects may be the same, when viewed in combination with the accompanying header or footer the byte pattern will appear to be different, which is another hindrance to finding commonality for the purpose of de-duplication.

Figure 10:
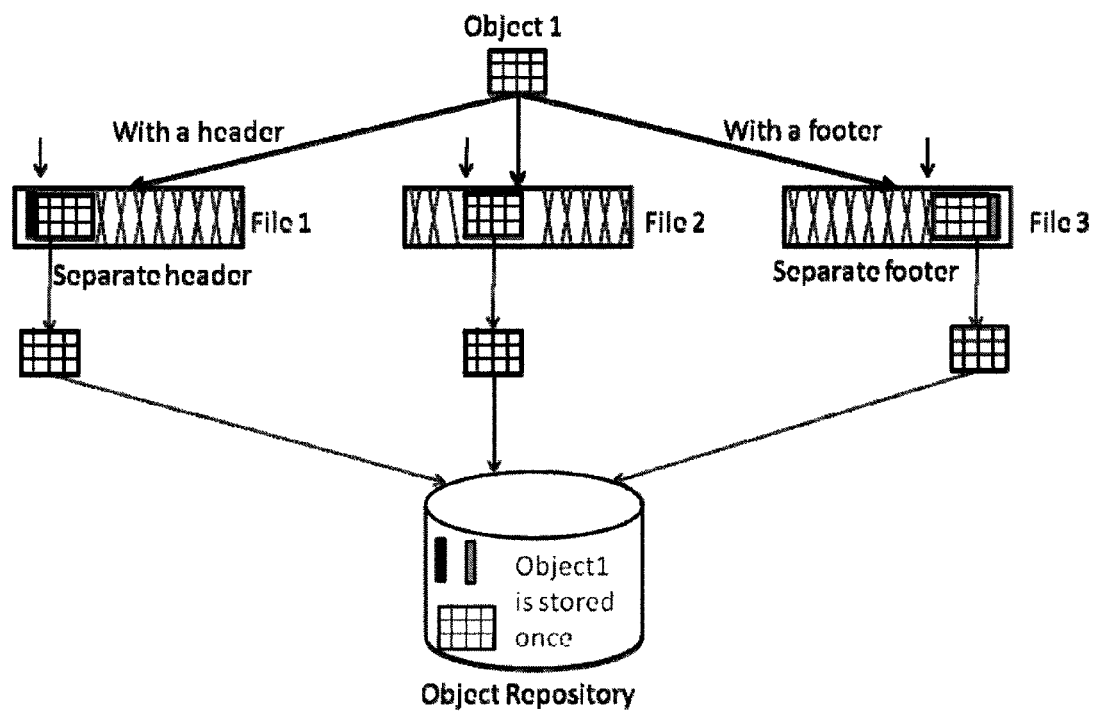
FIG. 10 shows instances of an object originally stored with a header/footer stored once in an object repository with the header/foot removed from the object and instead stored separately from the header/footer.

The proposed method analyzes the logical object for any header or footer data and removes it from the chunk being created for the purpose of identifying duplicate blocks. FIG. 10 shows three instances of a logical object: a first one originally stored in File 1 with a header, a second stored in File 2 without a header or a footer, and a third instance stored in File 3 with a footer. The three instances are stored in an object repository as a single instance of the chunk that the three instances had in common (without the header/footer). The header and footer originally contained in the object instances from File 1 and 2, respectively, are stored separately in the repository, along with associations linking the chunk and the header/footer data to the respective files in which they were originally stored. This storage and association process is discussed in additional detail, below.

Figure 11:
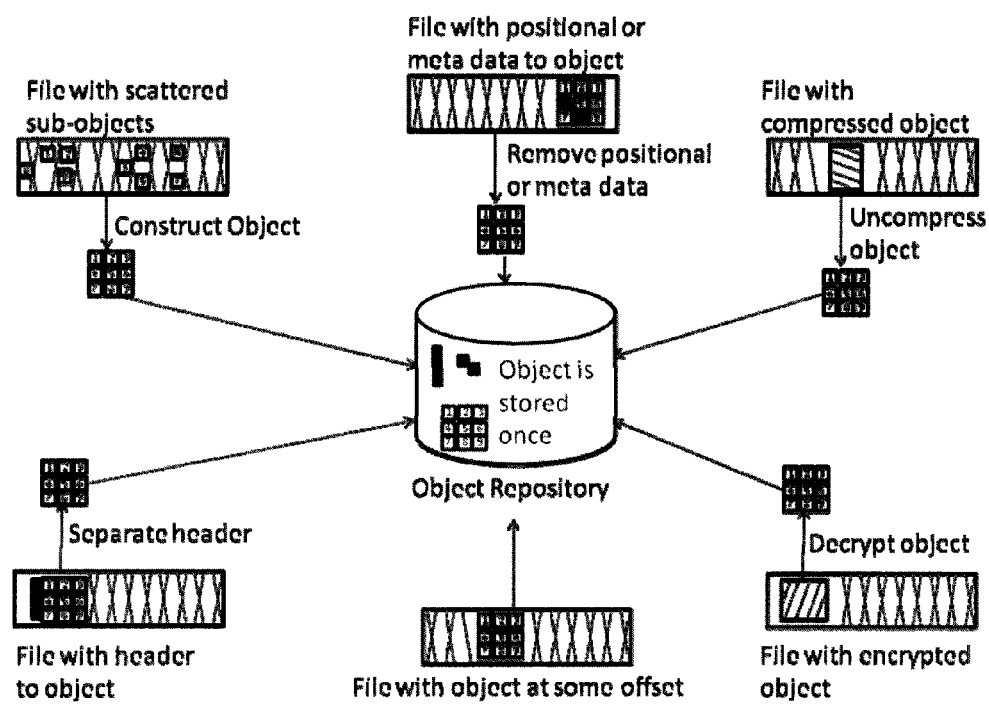
FIG. 11 shows instances of an object—originally stored in different files with different storage arrangements, positional data, metadata, transformations, separate headers/footers, and/or stored at different offsets—stored once in object repository without the transformations.

Multiple files can have one or more of the transformations described above. FIG. 11 shows that even with different transformations, the system will find common objects across different files and can store only a single instance of the object in an object repository.

6. Handle Compound Data Units like .PST/.ZIP Files, which Contain File Objects

Figure 12:
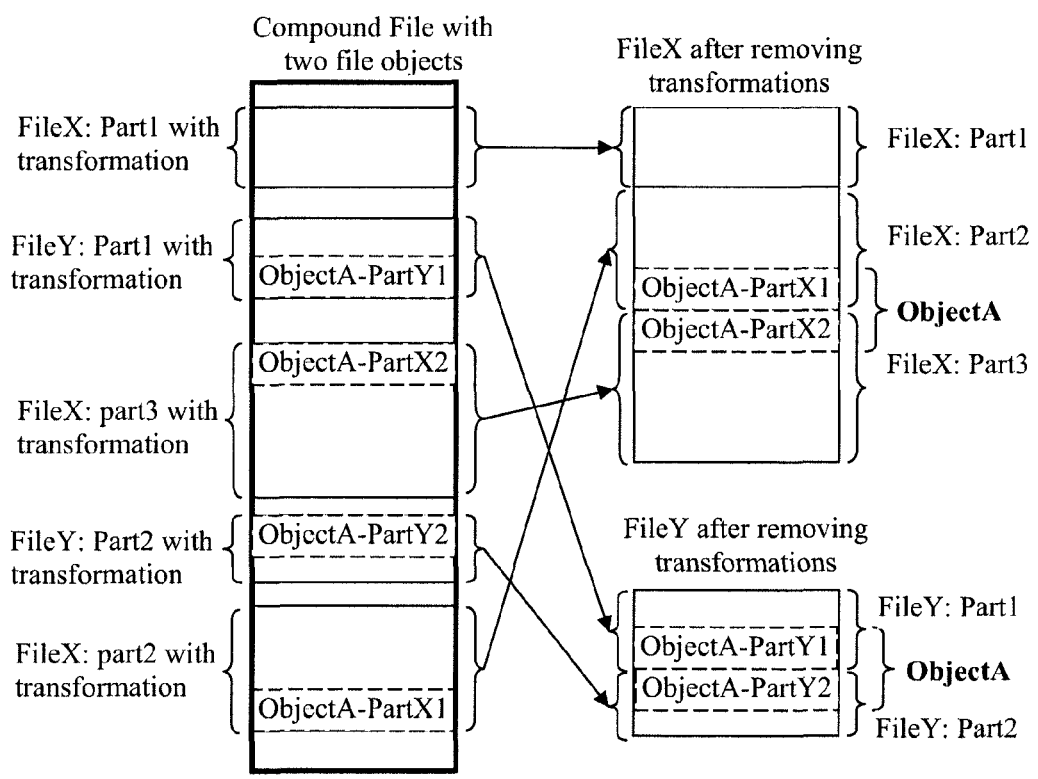
FIG. 12 shows an object, instances of which were originally transformed and stored in two non-contiguous file objects within a compound file, reassembled into contiguous instances of the object, each with the transformations removed.

A compound file, as the name indicates, is comprised of one or more sub-objects that are files, and in addition may contain other sub-objects that are not files. Some examples of compound file formats include .zip (compressed files), .pst (Microsoft Outlook files), .cab, .a, .edb (Microsoft Exchange Database files), Microsoft SQL Server database, Lotus Notes mailbox, SharePoint Repositories, and EMC Documentum formats. These file objects first need to be assembled using an understanding of the format of these compound files, in addition to using the other methods. During the assembly, transformations such as decryption or un-compression, removing header/footer, assembling scattered file sub-objects may also be applied. After assembling the file object, some or all of the above methods for finding further chunks/objects within a file object are applied. FIG. 12 shows Object A, two instances of which were originally transformed and stored in two non-contiguous file objects (FileX and FileY) within a compound file. The figure also shows how Object A may be identified as a duplicate chunk in both files after the files are reassembled into contiguous files, and the transformations removed.

Certain compound file formats can be hierarchical and/or contain objects which are themselves compound objects in which objects contain more objects. In these cases, the above methods can be applied recursively to identify and assemble logical objects at lower levels of the compound hierarchy.

Storage of Digital Data as Logical Objects to Enable Reconstruction of the Original Data After common objects/chunks have been identified in a set of digital data, the digital data is stored in terms of those objects/chunks in order to reduce the storage and network footprint required for storing the data. Each of the common objects is stored in an de-duplication object repository with an associated identifier. As described below, a representation of the original digital data is then stored using the identifiers to take the place of the common objects.

Figure 13:
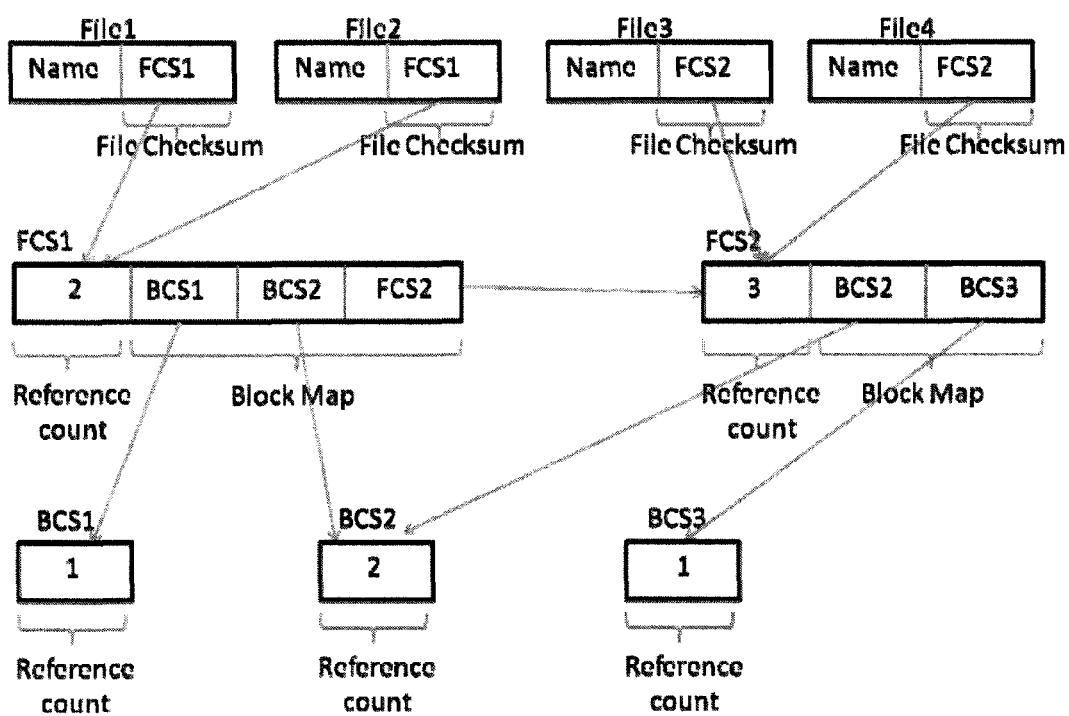
FIG. 13 illustrates file to file-checksum mapping and file-checksum to block-checksum mapping.

FIG. 13 shows a result of storing four files using the above methods of identifying common logical objects/chunks within those files. Prior to being stored as shown in FIG. 13, File 1-File 4 originally had different names from each other, but shared multiple common logical objects. Specifically, Files 1 and 2 both contained three of the same objects, one of which was a file. Files 3 and 4 were additional, separate instances of the file contained in Files 1 and 2. In addition, Files 3 and 4 contained a common logical block that was also contained in Files 1 and 2.

FileCheckSum:

For each file, a checksum (or hash) can be computed for the entire file. Hash functions may include secure hash algorithms (SHA) such as SHA-0, SHA-1, and/or SHA-2 and/or the MD5 algorithm. When storing digital data (e.g., files) as logical objects, each original file is represented as a de-duplicated file object and stored in a catalog. The de-duplicated file object contains the name of the original file (and/or other identifier of the digital data), along with the file checksum and possibly other attributes such as last-modified time. The checksum provides the identity (e.g., a pointer or reference to) of a FileCheckSum. The FileCheckSum represents the original file, but stored in terms of the common logical objects originally contained in the file. In some cases, the term FileCheckSum may be used as a way to refer to the checksum/hash value that is used to identify the FileCheckSum. FileCheckSums have a BlockMap and an XBlock, as described below.

The FileCheckSum (and the BlockCheckSum objects described below) are stored in a de-duplication repository that is associated with the catalog containing the de-duplicated file objects. The catalog could be a backup catalog of the file objects. The catalog can also be used for non-backup purposes, such as part of a primary file system (e.g., for active, on-going use).

BlockMap:

The following information is stored in the BlockMap:
1. Block map header containing version, length etc.
2. XBlock CheckSum (XBlock is described below)
3. List of blocks in this file, storing for each block:
   a. BlockCheckSum
   b. Number of bytes used in the XBlock
4. List of files inside this compound file, storing for each file:
   a. FileCheckSum
   b. Number of bytes used in the XBlock BlockCheckSum:

A BlockMap has a list of BlockCheckSum objects that identify the logical objects/chunks that comprised at least a portion of the digital data as originally stored. A BlockCheck- Sum is associated with a logical object/chunk, where the information in the logical object is stored only once in an object repository. As such, the BlockCheckSum provides part of 'the raw material' from which files can be restored. For each BlockCheckSum, a checksum is computed for the associated logical object that the BlockCheckSum represents in a manner similar to FileCheckSum identifiers. The BlockCheckSum is identified by this checksum. FIG. 13 shows three BlockCheckSums, BCS1-BCS3, where the BlockMap of FCS1 points to BCS1 and BCS2, and the BlockMap of FCS2 points to BCS2 and BCS3. The BlockMap of FCS1 also points to FCS2.

XBlock:

The XBlock contains information about each of the objects that made up the original file, including the various methods that were applied to the original object in the file during the chunking process, as well as the non-chunk data such as page numbers. The XBlock can be used to re-apply the various transformations and removed/changed data that were removed from the constituent chunks during the partitioning process, and to reconstruct the original file using the combination of the chunks and the non-chunk data (e.g., position-dependent, instance-dependent, and/or header/footer data that was removed from the chunks and stored separately from them). The XBlock contains the following information about each logical object in the associated BlockMap, where the specific information stored for each object will depend on its type and the methods applied during the chunking process:

1. Type of transformation, e.g., compression or encryption algorithm used if the object is originally stored in the file as compressed/encrypted. In this case, at least the following fields are used inside the XBlock:
   a. Type of XBlock information
   b. Compression/Encryption algorithm type
2. Positional/metadata separated from the object. In this case, at least the following fields are used inside the XBlock:
   a. Type of XBlock information
   b. Offset into the object where this positional/metadata needs to be inserted
   c. Length of the positional/metadata
   d. Positional/metadata
3. Header/footer to the object. In this case, at least the following fields are used inside the XBlock:
   a. Type of XBlock information
   b. Is this a header or footer
   c. Length of header or footer
   d. The header/footer data
   This information can be used to separate the header/footer information about the object from the object.
4. Broken object. In this case, at least the following fields are used inside the XBlock:
   a. Type of XBlock information
   b. Number of pieces the object is broken into
   c. For each broken piece in the object, the following information is stored:
      3. Offset in the file where this piece is present
      2. Length of the piece at this offset
   This information can be used to re-create a logical object in a restored version of the digital data even if it was not originally contiguously placed inside the file. Many file formats keeps one logical objects at multiple non-contiguous location within a file.
5. Sub-files objects inside the compound file. In this case, at least the following fields are used inside the XBlock:
   a. Type of XBlock information
   b. Number of pieces this sub-file is broken inside the compound file
   c. For each piece, at least the following information is stored:
      1. Offset in the compound file
      2. Length of this piece at the above offset
   d. Type of transformation to be applied, e.g., compression type or encryption type after constructing the sub-file. For example in .PST file formats, the sub-files (attachments) are stored broken into the compound file and encrypted.
      This type of information can be used to create a logical file object inside the compound file. After constructing the each file object from compound file, the smaller logical objects are again found inside the file object. This allows system to find commonality even when objects are inside the sub-file in the compound file.

Mapping De-duplicated File Objects to FileCheckSums, and FileCheckSums to BlockCheckSums.

As explained above, the de-duplicated file objects stored in the catalog contain identifiers of respective FileCheckSums, shown in FIG. 13 as "FCS1" and "FCS2" in the de-duplicated file objects File 1-File 4. Each FileCheckSum has a reference count equal to number of de-duplicated file objects (and possibly other FileCheckSums) that refer to the particular FileCheckSum. For example, in FIG. 13, FileCheckSum 1 is being referenced by two files, for a reference count of 2, and FileCheckSum 2 is being referenced three times, twice in files, and once in FileCheckSum 1, for a reference count of 3.

Also as explained above, each FileCheckSum has a BlockMap which contains the list of BlockCheckSums (specifically, the identifiers of the BlockCheckSums) that constituted the original digital file. Similar to the FileCheckSums, each BlockCheckSum has a reference count which is equal to the number of times it is being referenced by the BlockMaps.

A FileCheckSum is not deleted until the reference count is zero, e.g., no file (or other FileCheckSum) is referring to it. Similarly a BlockCheckSums is not deleted until the reference count is zero, e.g., no FileCheckSum is referring it to.

The systems and methods described above can be used as new documents are created, to allow new documents to be stored with reduced duplication. They can also be used with existing files and other data in storage for de-duplicating the stored data to reduce the amount of data being stored.

Having described certain embodiments, it should be apparent that modifications can be made without departing from the scope of the appended claims. For example, different types of processors and memory can be used. There are many references to maintaining data in storage. The storage can be any suitable form of memory, such as digital disks, optical disks, or semiconductor memory. The processing acts that are described can be performed with any suitable hardware and/or software logic, or combination thereof, and implemented in any suitable processor, such as a general purpose processor or an application-specific product. Many of the acts described above can be performed by a processor in software that can be stored in computer-readable memory as instruction that, when executed, perform the steps, such as chunking, hashing, comparing, storing data, maintaining blocks, etc.

While the specification refers to removing position-dependent data, removing instance-dependent data, removing one or more format-specific headers or footers from the source logical object, and removing format-specific transformations from the source logical object, other types of data removal can be envisioned. The format of the data can be in a one-to-one correspondence with a type of data removal or transformation, or there can be multiple combinations of data removal and transformations associated with different formats. For example, one format could include removing certain position-dependent data and instance-dependent data, while a second format could include removing position-dependent data and format-specific transformations, and a third format could include only removing one or more format-specific headers or footers.

In addition, data partitioning could consist of just identifying and assembling a logical object that was originally stored in the digital data as one or more sub-objects scattered across multiple storage blocks. In this case, the assembled object is stored along with information indicative of the position or positions of the original object and/or its sub-objects.

What is claimed is:

1. A computer-implemented method for partitioning and storing a first file in a repository, said repository comprising a plurality of stored objects corresponding to a plurality of stored files, wherein each of said stored objects corresponds to one or more of said stored files, wherein said first file comprises a plurality of data objects and is different from each of said plurality of stored files, the method comprising:
    determining a format of the first file;
    identifying each of the data objects corresponding to the first file at least in part on the basis of the determined format; and
    for each of said identified data objects:
        processing said identified data object on the basis of the determined format in order to create a further data object, said processing comprising removing, at least in part, information relating to the identified format from said identified data object;
        comparing the further data object with said plurality of stored objects in order to determine whether the further data object corresponds to one of said plurality of stored objects; and
        storing the further data object in the repository in dependence on said comparison.

2. The method of claim 1, wherein the first file includes one of:
    a compressed zip file;
    a Personal Storage Table (PST) file;
    a cabinet (cab) file;
    an archive file;
    an Exchange Database;
    a Microsoft SQL Server database;
    a Lotus Notes mailbox;
    a SharePoint Repository and an EMC Documentum file.

3. The method of claim 1, further comprising assembling a first identified data object and a second identified data object in a contiguous form in dependence on said comparison.

4. The method of claim 1, wherein said processing of an identified first data object comprises the steps of decompressing and/or decrypting.

5. The method of claim 1, wherein said processing of an identified data object comprises the steps of removing data indicative of at least one of a page number, a slide number, a paragraph number, and a Microsoft Excel cell number.

6. The method of claim 1, wherein said processing of an identified data object comprises the steps of removing data indicative of a position of the identified data object in relation to the first file or in relation to a further identified data object.

7. The method of claim 1, wherein said processing of an identified data object comprises the steps of removing data indicative of at least one of: an author name, a modified date/time, a revision identifier, total editing time, number of pages, number of characters, number of lines, number of paragraphs, and number of words.

8. The method of claim 1, the method comprising performing said comparison independently of information associating the plurality of stored blocks with the plurality of stored files.

9. The method of claim 1, further comprising storing data indicative of an association between a further data object and at least one of: a position of the corresponding identified data object in relation to the first file, metadata associated with the first file or the determined format.

10. The method of claim 1, the method comprises generating an identifier associated with said further data object for use in said comparison.

11. The method of claim 10, wherein the identifier associated with the identified data object is generated on the basis of a checksum or a hash of the corresponding further data object.

12. The method of claim 1, further comprising transmitting data indicative of said further data object.

13. The method according to claim 1, wherein said processing of an identified data object comprises removing one or more of:
    data indicative of position of the identified data object in relation to the first file;
    metadata associated with the first file; and
    data associated with the determined format.

14. A system comprising:
    a memory comprising a plurality of stored objects corresponding to a plurality of stored files; and
    a processor configured to:
    determine a format of a first file, wherein said first file comprises a plurality of data objects and is different from each of said plurality of stored files;
    identify each of the data objects corresponding to the first file at least in part on the basis of the determined format;
    for each of said identified objects:
        process said identified data object on the basis of the determined format in order to create a further data object, said processing comprising removing, at least in part, information relating to the identified format from said identified data object;
        compare said identified data object with said plurality of stored objects in order to determine whether the further data object corresponds to one of said plurality of stored data objects; and
        store the further data object in the memory in dependence on said comparison.

15. The system of claim 14, wherein the first file includes one of:
    a compressed zip file;
    a Personal Storage Table (PST) file;
    a cabinet (cab) file;
    an archive file;
    an Exchange Database;
    a Microsoft SQL Server database;
    a Lotus Notes mailbox;
    a SharePoint Repository and an EMC Documentum file.

16. The system of claim 14, further comprising assembling an identified data object and a second identified data object in a contiguous form in dependence on said comparison.

17. The system of claim 14, wherein said processing of an identified data object comprises the steps of decompressing and/or decrypting.

18. The system of claim 14, wherein said processing of an identified data object comprises the steps of removing data indicative of at least one of a page number, a slide number, a paragraph number, and a Microsoft Excel cell number.

19. The system of claim 14, wherein said processing of an identified data object comprises the steps of removing data indicative of a position of the identified data object in relation to the first file or in relation to a further identified data object.

20. The system of claim 14, wherein said processing of an identified data object comprises the steps of removing data indicative of at least one of: an author name, a modified date/time, a revision identifier, total editing time, number of pages, number of characters, number of lines, number of paragraphs, and number of words.

21. The system of claim 14, the method comprising performing said comparison independently of information associating the plurality of stored blocks with the plurality of stored files, and performing said comparison independently of information associating the plurality of stored blocks with the plurality of stored files.

22. The system of claim 14, further comprising storing data indicative of an association between said further data object and at least one of: a position of the corresponding identified data object in relation to the first file, metadata associated with the first file or the determined format.

23. The system of claim 14, wherein generating an identifier associated with a further data object for use in said comparison.

24. The system of claim 23, wherein the identifier associated with the further data object is generated on the basis of a checksum or a hash of the corresponding further data object.

25. The system of claim 14, further comprising transmitting data indicative of said further data object.

26. The system of claim 14, wherein said processing of an identified data object comprises removing one or more of:
   data indicative of position of the identified data object in relation to the first file;
   metadata associated with the first file; and
   data associated with the determined format.

27. A computer-implemented method for partitioning and storing a first file in a repository, said repository comprising a plurality of stored objects corresponding to a plurality of stored files, wherein the first file comprises a plurality of data objects and is different from each of said plurality of stored files, the method comprising:
   determining a format of the first file;
   identifying each of the data objects corresponding to the first file at least in part on the basis of the determined format;
   for each of said identified data objects:
      processing said identified data object on the basis of the determined format in order to create a further data object, said processing comprising removing, at least in part, information relating to the identified format from said identified data object;
      comparing the further data object with said plurality of stored objects in order to determine whether the further data object corresponds to one of said plurality of stored objects;
      storing the further data object in the repository in dependence on said comparison; and
      storing data indicative of an association between the further data object and the first file in the repository, said data indicative of said association comprising data indicative of at least one of: a position of the identified data object corresponding to the further data object in relation to the first file, metadata associated with the first file and the determined format.

28. A system comprising:
   a memory comprising a plurality of stored objects corresponding to a plurality of stored files; and
   a processor configured to:
      determine a format of a first file, wherein said first file comprises a plurality of data objects and is different from each of said plurality of stored files;
      identify each of said data objects corresponding to the first file at least in part on the basis of the determined format;
      for each of the identified data objects:
         process the identified data object on the basis of the determined format in order to create a further data object, said processing comprising removing, at least in part, information relating to the identified format from said identified data object;
         compare the further data object with said plurality of stored objects in order to determine whether the further data object corresponds to one of said plurality of stored data objects;
         store the further data object in the repository in dependence on said comparison; and
         store data indicative of an association between the further data object and the first file in the repository, said data indicative of said association comprising data indicative of at least one of: a position of the identified data object corresponding to the further data object in relation to the first file, metadata associated with the first file and the determined format.

* * * * *